(12) United States Patent
Chozui

(10) Patent No.: US 8,369,418 B2
(45) Date of Patent: Feb. 5, 2013

(54) DIGITAL DATA RECEIVER

(75) Inventor: Sadatoshi Chozui, Osaka (JP)

(73) Assignee: Panasonic Corporation, Osaka (JP)

( * ) Notice: Subject to any disclaimer, the term of this patent is extended or adjusted under 35 U.S.C. 154(b) by 558 days.

(21) Appl. No.: 12/445,880

(22) PCT Filed: Aug. 24, 2007

(86) PCT No.: PCT/JP2007/066422
§ 371 (c)(1),
(2), (4) Date: Apr. 16, 2009

(87) PCT Pub. No.: WO2008/047510
PCT Pub. Date: Apr. 24, 2008

(65) Prior Publication Data
US 2010/0322320 A1     Dec. 23, 2010

(30) Foreign Application Priority Data
Oct. 17, 2006 (JP) .................... 2006-282939

(51) Int. Cl.
*H04N 7/68* (2006.01)

(52) U.S. Cl. ................................. 375/240.27

(58) Field of Classification Search ........................ None
See application file for complete search history.

(56) References Cited

U.S. PATENT DOCUMENTS

| | | | |
|---|---|---|---|
| 5,247,363 A | | 9/1993 | Sun et al. |
| 5,502,727 A | | 3/1996 | Catanzaro et al. |
| 5,579,317 A | * | 11/1996 | Pang et al. .................... 370/392 |
| 6,026,506 A | * | 2/2000 | Anderson et al. .............. 714/746 |
| 6,530,055 B1 | | 3/2003 | Fukunaga |
| 6,950,443 B1 | * | 9/2005 | Kaneko .......................... 370/474 |
| 2002/0003948 A1 | * | 1/2002 | Himeno et al. .................. 386/98 |
| 2003/0023710 A1 | * | 1/2003 | Corlett et al. .................. 709/223 |
| 2003/0185212 A1 | * | 10/2003 | Kelly et al. ................. 370/395.1 |

(Continued)

FOREIGN PATENT DOCUMENTS

| | | |
|---|---|---|
| EP | 0 624 968 | 11/1994 |
| JP | 6-70306 | 3/1994 |

(Continued)

OTHER PUBLICATIONS

ISO/IEC 13818-1:2000(E) pp. 18-20.

(Continued)

*Primary Examiner* — Thai Tran
*Assistant Examiner* — Sunghyoun Park
(74) *Attorney, Agent, or Firm* — Hamre, Schumann, Mueller & Larson, P.C.

(57) ABSTRACT

To be able to combine audio quality with video quality, a digital data receiver (100) performs different processing depending on the type of those packets among TS packets, in which errors occur. To this end, the digital data receiver (100) includes: a PID filtering section (102) for identifying video packets and audio packets, a transport error indicator detecting section (104b) for determining whether a video packet is an error packet based on its header information, a video packet removing section (107b) for removing a video packet determined to be an error packet only when the video packet satisfies predetermined conditions, a transport error indicator detecting section (104c) for determining whether an audio packet is an error packet based on its header information, and an audio packet removing section (107c) for removing an audio packet determined to be an error packet.

8 Claims, 10 Drawing Sheets

U.S. PATENT DOCUMENTS

| | | | |
|---|---|---|---|
| 2005/0044471 A1* | 2/2005 | Chia et al. | 714/776 |
| 2005/0286566 A1* | 12/2005 | Tong et al. | 370/503 |
| 2008/0065963 A1* | 3/2008 | Ko et al. | 714/776 |

FOREIGN PATENT DOCUMENTS

| | | |
|---|---|---|
| JP | 7-99540 | 4/1995 |
| JP | 7-111654 | 4/1995 |
| JP | 8-251178 | 9/1996 |
| JP | 2000-156705 | 6/2000 |
| JP | 2000-307672 | 11/2000 |
| JP | 2001-086494 | 3/2001 |
| JP | 2005-260606 | 9/2005 |
| JP | 2005-333452 | 12/2005 |
| JP | 2006-086941 | 3/2006 |
| WO | WO2006/106683 | 10/2006 |

OTHER PUBLICATIONS

ISO/IEC 13818-2:2000(E) pp. 21-37.
ISO/IEC 13818-7:1997(E) pp. 14-23.

\* cited by examiner

DIGITAL DATA RECEIVER

TECHNICAL FIELD

The present invention relates to a digital data receiver receiving and processing digital data transmitted via digital broadcasts and streaming.

BACKGROUND ART

In recent years, digital broadcasting involving digitizing and broadcasting video and audio signals has been put into practice and a full transition from terrestrial analog broadcasting to digital broadcasting is impending in the near future. In digital broadcasting, video signals and audio signals are multiplexed and, after scrambling, as the occasion demands, in order to enable viewing only by specific viewers, turned into a transport stream. The transport involves partitioning into fixed length packets (transport stream packets: TS packets) and transmission. A digital broadcast receiver receives and demodulates digital broadcast data, generates TS packets, performs filtering to extract the TS packets of the channel selected by the viewer, and outputs them upon descrambling, if necessary.

FIG. 10 illustrates the format of a TS packet according to the MPEG2_TS (Moving Picture Experts Group 2 Transport Stream) standard widely used in digital broadcasting. As shown in FIG. 10, a TS packet is made up of a 4-byte (32-bit) TS packet header and a 184-byte payload. The TS packet header contains various control information pertaining to the TS packet. The payload, which is an area used for the storage of user data, has a PES packet, which contains image and audio, section data, which contains various types of service information, etc., and an adaptation field, which contains time information, etc.

The TS packet header includes a transport error indicator. The transport error indicator is a 1-bit flag. During the demodulation of the digital broadcast data and generation of TS packets in the digital broadcast receiver, it is set to "1" if it is found that there is an uncorrectable bit error of at least one bit in the TS packet. Namely, in the subsequent processing by the digital broadcast receiver, it is understood that the packet contains an uncorrectable bit error if the transport error indicator of the TS packet header is set to "1".

When the transport error indicators of the TS packets are checked and errors are detected in a conventional digital broadcast receiver, in some digital broadcast receiver, the TS packets may be discarded on the assumption that these TS packets cannot be used (e.g., see Patent document 1).

Moreover, in order to minimize the occurrence of freeze-ups when TS packet dropouts and errors occur in a digital broadcast receiver installed in a mobile unit experiencing unstable radio reception, such as an in-vehicle TV, in the past, it has been proposed (e.g., see Patent document 2) to interpolate transmitted MPEG4 video using a single segment instead of the missed packets or erroneous packets.

Patent document 1: JP 2000-156705A
Patent document 2: JP 2005-260606A

DISCLOSURE OF INVENTION

Problem to be Solved by the Invention

However, the problem with the above-described conventional method is that video quality might sometimes decrease as a result of uniformly discarding or interpolating erroneous packets.

If an error occurs in an audio packet, even a small error will result in a high noise level when the audio packet is decoded. Therefore, when an error occurs in an audio packet, it is preferable to discard the audio packet. On the other hand, if an error occurs in a video packet, it might not influence video quality significantly even when the video packet is decoded. Therefore, if the erroneous packet is a video packet, decoding it as is without discarding or interpolating the packet using MPEG4 video often will yield video of a higher quality.

Thus, the present invention, which was made taking into account the above-mentioned problem, has its purpose in providing a digital data receiver capable of combining audio quality with video quality by performing different processing depending on the type of packets, in which errors occur among the TS packets.

Means for Solving Problem

In order to attain the above-mentioned purpose, the digital data receiver according to the present invention includes a filtering section that identifies a video packet and an audio packet contained in received digital data, a video processing section that performs the decoding processing of the video packet identified by the filtering section and outputting video data, and an audio processing section that performs the decoding processing of the audio packet identified by the filtering section and outputting audio data. The video processing section includes a video packet error detecting section that references header information in the video packet to determine whether the video packet is an error packet, and a video packet removing section that removes a video packet determined to be an error packet only when the video packet satisfies predetermined conditions, and the audio processing section includes an audio packet error detecting section that references header information in the audio packet to determine whether the audio packet is an error packet, and an audio packet removing section that removes an audio packet determined to be an error packet.

In accordance with the above-described configuration, in the audio processing section, which performs the decoding processing of audio packets and outputs audio data, the audio packet removing section minimizes noise etc. caused by errors in the audio packets by removing the audio packets determined to be error packets. Moreover, in the video processing section, which performs the decoding processing of video packets and outputs video data, the video packet removing section removes video packets determined to be error packets only when the video packets satisfy predetermined conditions, thereby minimizing the video packet discard rate and maintaining video quality. This makes it possible to provide a digital data receiver capable of combining audio quality with video quality.

For example, in the digital data receiver, the video packet removing section preferably removes a video packet determined to be an error packet only when one or more video packets preceding the video packet determined to be an error packet have not been received or when these are error packets.

Moreover, in the digital data receiver, the video packet removing section preferably removes video packets determined to be error packets only when the number of the video packets determined to be error packets among the video packets contained in an encoding processing unit exceeds a predetermined criterion.

Furthermore, in the digital data receiver, the video packet removing section also preferably removes a video packet determined to be an error packet when the video packet is the leading packet of an encoding processing unit.

Moreover, in the digital data receiver, the audio packet removing section preferably removes one or more audio packets subsequent to an audio packet determined to be an error packet.

Moreover, in the digital data receiver, the audio packet removing section preferably removes all the audio packets contained in an encoding processing unit when an audio packet determined to be an error packet is present among the audio packets contained in the encoding processing unit.

Furthermore, in the digital data receiver, when an audio packet determined to be an error packet is present among the audio packets contained in an encoding processing unit, the audio packet removing section preferably removes an error packet contained in the encoding processing unit and all the audio packets preceding thereto.

Moreover, in the digital data receiver, the audio packet removing section preferably removes an audio packet determined to be an error packet and inserts an audio packet containing specific information indicating a discontinuity detectable by an audio decoder in the subsequent stage.

Moreover, in the digital data receiver, there is preferably further provided a program/tuning information packet removing section that removes a tuning/program information packet determined to be an error packet. Furthermore, the program/tuning information packet removing section may remove all the program/tuning information packets contained in an encoding processing unit when a program/tuning information packet determined to be an error packet is present among the program/tuning information packets contained in the encoding processing unit.

Effects of the Invention

The present invention, as described above, can provide a digital data receiver capable of combining audio quality with video quality.

DESCRIPTION OF THE INVENTION

Several embodiments of the present invention are described below with reference to drawings.

Figure 1:
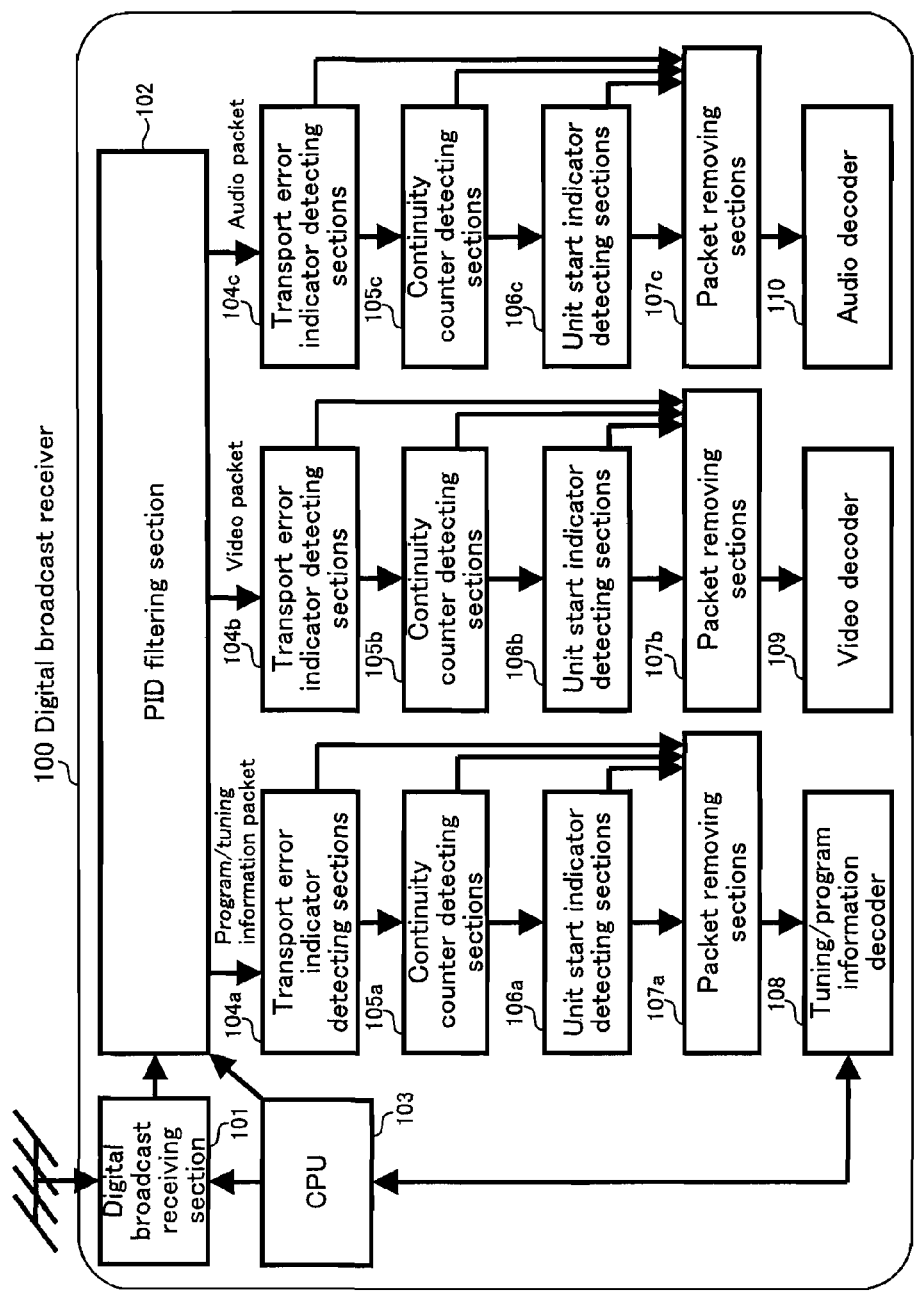
FIG. 1 is a block diagram schematically illustrating the configuration of a digital broadcast receiver according to an embodiment of the present invention.

FIG. 1 is a block diagram schematically illustrating the configuration of a digital broadcast receiver according to an embodiment of the present invention. As shown in FIG. 1, the digital broadcast receiver 100 includes a digital broadcast receiving section 101, a PID filtering section 102, a CPU 103, transport error indicator detecting sections 104a-104c, continuity counter detecting sections 105a-105c, unit start indicator detecting sections 106a-106c, packet removing sections 107a-107c, a tuning/program information decoder 108, a video decoder 109, and an audio decoder 110.

It should be noted that while FIG. 1 represents the functional configuration of the digital broadcast receiver 100 according to the present embodiment, the hardware configuration of digital broadcast receivers representing implementations of the present invention is not intended to be limited to this particular configuration. Namely, functionalities illustrated as multiple independent blocks in FIG. 1 may be realized using a single hardware element. For example, in FIG. 1, blocks other than the digital broadcast receiving section 101 may be placed on a single LSI chip. Moreover, functionalities illustrated as a single block in FIG. 1 may be realized using multiple hardware elements.

Moreover, while the digital broadcast receiver 100 according to the present embodiment can be implemented, for example, as a set-top box, it can also be implemented as a digital TV receiver having the digital broadcast receiver 100 incorporated therein.

Figure 2:
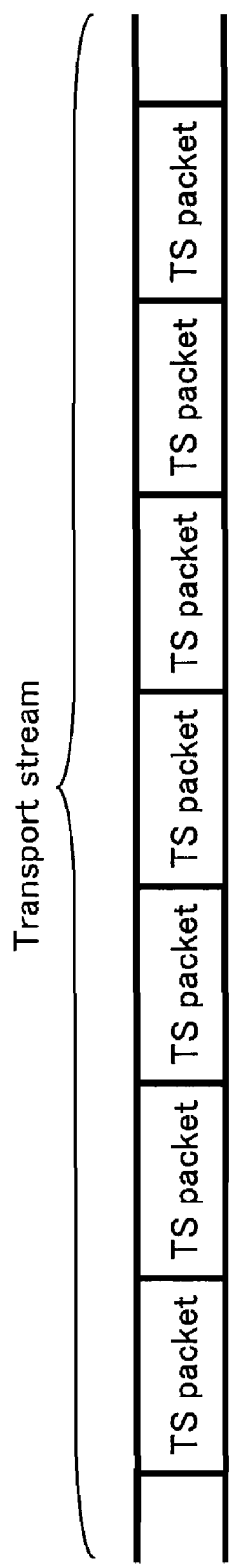
FIG. 2 is a diagram illustrating the data structure of a transport stream.

The digital broadcast receiving section 101 generates a transport stream by demodulating digital broadcast data received through an antenna and outputs it to the PID filtering section 102. As shown in FIG. 2, the transport stream is made up of multiple consecutive TS packets.

The transport error indicator detecting section 104a, continuity counter detecting section 105a, unit start indicator detecting section 106a, and packet removing section 107a constitute a series of devices used to process tuning/program information packets among the TS packets. The transport error indicator detecting section 104b, continuity counter detecting section 105b, unit start indicator detecting section 106b, and packet removing section 107b constitute a series used to process video packets among the TS packets. The transport error indicator detecting section 104c, continuity counter detecting section 105c, unit start indicator detecting section 106c, and packet removing section 107c constitute a series used to process audio packets among the TS packets.

The PID filtering section 102 partitions the transport stream received from the digital broadcast receiving section 101 into TS packets, determines the type of each TS packet by establishing whether this is a video packet, an audio packet, or a tuning/program information packet, and, in dependence on the type of the packets, outputs them by distributing them to any one of the transport error indicator detecting sections 104a-104c. Namely, among the TS packets obtained by partitioning the transport stream generated by the digital broadcast receiving section 101, the tuning/program information packets are outputted by the PID filtering section 102 to the transport error indicator detecting section 104a. Moreover, among the TS packets obtained by partitioning the transport stream generated by the digital broadcast receiving section 101, the video packets are outputted by the PID filtering section 102 to the transport error indicator detecting section 104b, and the audio packets are outputted to the transport error indicator detecting section 104c.

Figure 10:
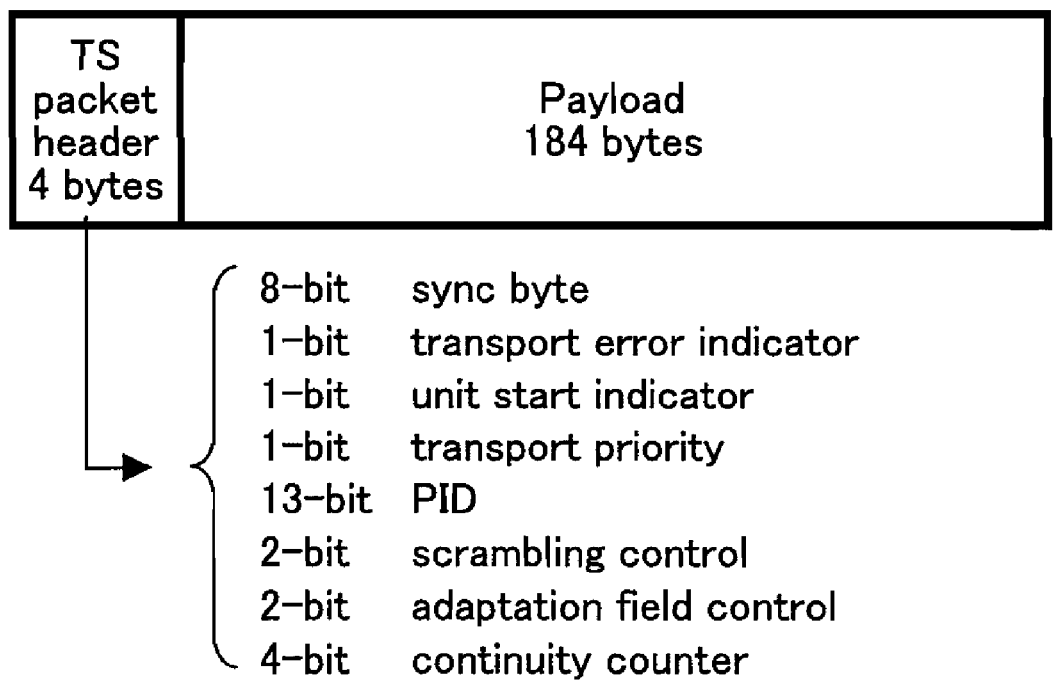
FIG. 10 is a diagram illustrating the data structure of a TS packet.

As shown in FIG. 10, a TS packet is made up of a 4-byte (32-bit) TS packet header and a 184-byte payload. The TS packet header contains various control information pertaining to the TS packet. The payload, which is an area used for the storage of user data, has a PES packet, which contains image and audio, section data, which contains various types of service information etc., and an adaptation field, which contains time information, etc.

The TS packet header is composed of an 8-bit sync byte, a 1-bit transport error indicator, a 1-bit payload unit start indicator, a 1-bit transport priority, a 13-bit PID, 2-bit scrambling control, a 2-bit adaptation field control, and a 4-bit continuity counter.

The sync byte is an 8-bit fixed field, whose value is always "01000111". The transport error indicator is a 1-bit flag. If a CRC check is performed during demodulation by the digital broadcast receiving section 101 and it is found that an uncorrectable bit error of at least one bit exists in the TS packet, the transport error indicator is set to "1" by the digital broadcast receiving section 101. The payload unit start indicator is a 1-bit flag and if it is set to "1", it indicates that the TS packet is at the start of multiple TS packets having the same PID. When the transport priority is set to "1", it indicates that that the TS packet has a higher priority than other TS packets with the same PID that have their transport priority set to "0".

The PID, which is an ID used to identify TS packets, is a 13-bit field indicating the type of data stored in the packet payload. Namely, the PID filtering section 102 can determine whether this is a video packet, an audio packet, or a tuning/program information packet based on the value of PID.

The scrambling control indicates the scrambling mode of the TS packet payload. The adaptation field control indicates whether an adaption field and/or payload is subsequent to the TS packet header. The continuity counter shows the continuity of data between multiple TS packets. Among the multiple TS packets with the same PID, it is set to "0" in the leading TS packet and to values successively incremented by one in the subsequent TS packets. Therefore, by looking at the continuity counter, it can be determined whether a TS packet has been dropped.

The digital broadcast receiver 100 according to the present embodiment is characterized in that the packet removing sections 107a-107c perform processing in accordance with the error packet type when a packet containing an uncorrectable bit error (hereinafter referred to as "error packet") is detected among the received TS packets. The operation of the digital broadcast receiver 100 according to the present embodiment is explained in greater detail below.

As described above, the PID filtering section 102 distributes the received TS packets according to their type and outputs them to the transport error indicator detecting sections 104a-104c. Namely, the PID filtering section 102 outputs the tuning/program information packets to the transport error indicator detecting section 104a, the video packets to the transport error indicator detecting section 104b, and the audio packets to the transport error indicator detecting section 104c.

[1. Processing of Tuning/Program Information Packets]

First of all, explanations will be provided regarding the processing of the tuning/program information packets.

With respect to the tuning/program information packets sent from the PID filtering section 102 to the transport error indicator detecting section 104a, the transport error indicator detecting section 104a determines whether the packets contain an uncorrectable bit error. Namely, the transport error indicator detecting section 104a references the value of the transport error indicator of the TS packet header in a tuning/program information packet and determines that the packet is an error packet containing an uncorrectable bit error if the value is set to "1". When an error packet is detected, the transport error indicator detecting section 104a sends to the packet removing section 107a the PID and continuity counter value of the packet, as well as information indicating that the packet is an error packet. The transport error indicator detecting section 104a sequentially sends the tuning/program information packets received from the PID filtering section 102 to the continuity counter detecting section 105a regardless of whether these are error packets or not.

The continuity counter detecting section 105a checks the continuity of the tuning/program information packets sent from the transport error indicator detecting section 104a by referencing the continuity counter of the TS packet headers in the multiple tuning/program information packets sequentially sent from the transport error indicator detecting section 104a and confirming whether the continuity counter is incremented by one. When the continuity counter detecting section 105a detects a tuning/program information packet having in its continuity counter a value that is non-consecutive relative to the continuity counter value of the preceding tuning/program information packet, it sends to the packet removing section 107a the PID and continuity counter value of the packet, as well as information indicating that the packet is non-consecutive relative to the preceding tuning/program information packet. The continuity counter detecting section 105a also sequentially sends the tuning/program information packets received from the transport error indicator detecting section 104a to the unit start indicator detecting section 106a.

The unit start indicator detecting section 106a detects the leading packet of the section data by receiving the tuning/program information packets sequentially sent from the continuity counter detecting section 105a and referencing the unit start indicators of the TS packet headers. When the leading packet of the section data is detected, the unit start indicator detecting section 106a sends the PID of the packet to the packet removing section 107a.

The packet removing section 107a performs error packet removal processing based on the information sent from the transport error indicator detecting section 104a, continuity counter detecting section 105a, and unit start indicator detecting section 106a.

It should be noted that it is desirable for the packet removing section 107a to discard as many tuning/program information packets detected to be error packets as possible. This is due to the fact that, in case of tuning/program information packets, the presence of a data error even in a single bit will easily produce a malfunction etc. during processing in the subsequent stage. Two preferred, but not limiting, specific examples of error packet removal processing performed in the packet removing section 107a when an error packet is present among the tuning/program information packets are listed below.

SPECIFIC EXAMPLE 1

Removal Processing of Tuning/Program Information Packets

The packet removing section 107a removes all the tuning/program information packets determined to be error packets by the transport error indicator detecting section 104a. In this manner, the occurrence of malfunctions and errors due to processing of error packets in the subsequent stages is avoided by eliminating the tuning/program information packets detected to be error packets.

SPECIFIC EXAMPLE 2

Removal Processing of Tuning/Program Information Packets

If just one error packet is detected by the transport error indicator detecting section 104a between a packet whose unit start indicator equals "1" (the leading packet of section data) and the following packet whose unit start indicator equals "1" (the leading packet of the next section data), the packet removing section 107a removes all the tuning/program information packets within this interval regardless of whether these are error packets or not.

Figure 3:
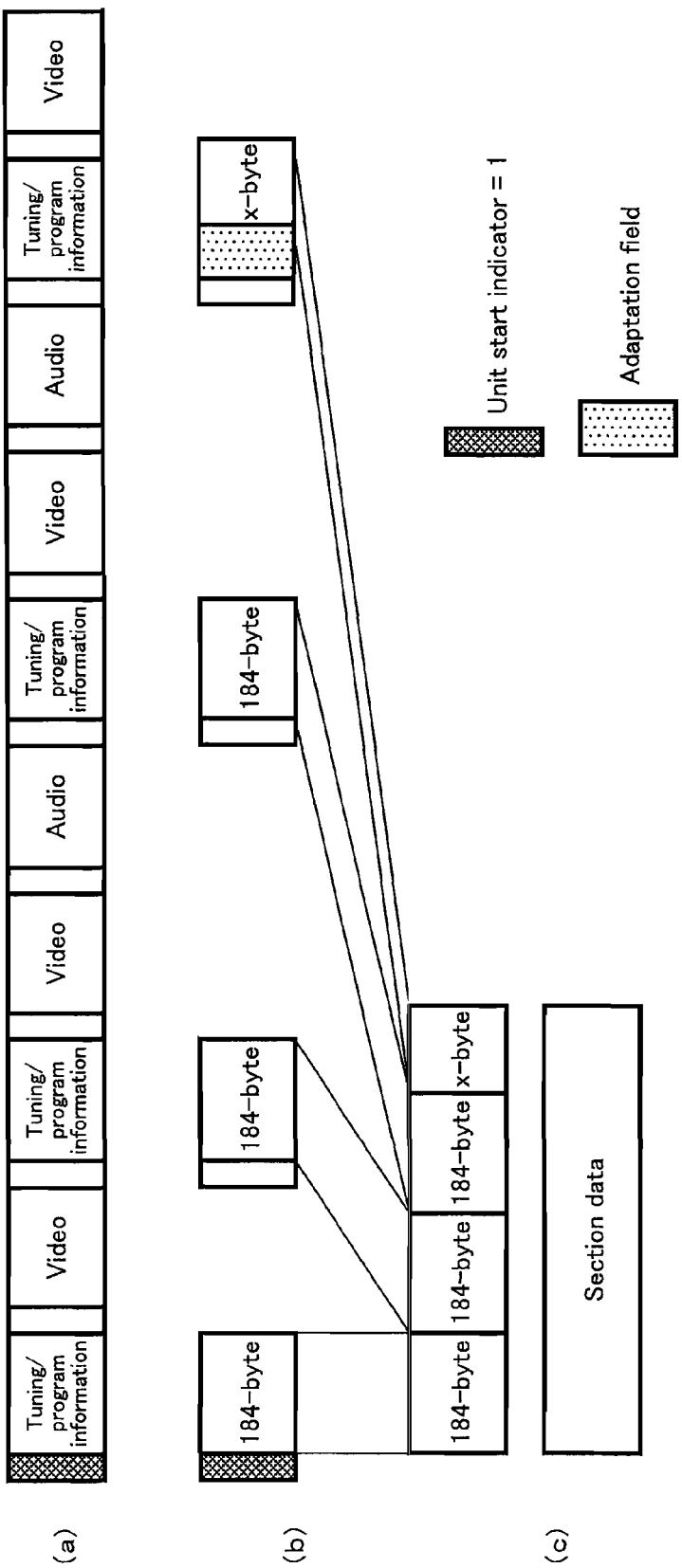
FIG. 3 is a diagram illustrating the structure of section data containing tuning/program information.

Tuning/program information is handled as section data. As shown in FIG. 3 (a)-(c), the section data is divided among the TS packets and embedded into the transport stream. If an error packet is present in the section data, data errors will be present in the entire section data. Therefore, if there is even a single error packet present, deleting all the tuning/program information packets within the same section data makes it possible to avoid the occurrence of malfunctions and errors due to processing of error packets in the subsequent stages in a more reliable manner than in the above-described Specific example 1.

[2. Processing of Video Packets]

The processing of video packets is explained next.

With respect to the video packets sent from the PID filtering section 102 to the transport error indicator detecting section 104b, the transport error indicator detecting section 104b determines whether the packets contain an uncorrectable bit error. Namely, the transport error indicator detecting section 104b references the value of the transport error indicator of the TS packet header in a video packet and determines that the packet is an error packet containing an uncorrectable bit error if the value is set to "1". When an error packet is detected, the transport error indicator detecting section 104b sends to the packet removing section 107b the PID and continuity counter value of the packet, as well as information indicating that the packet is an error packet. The transport error indicator detecting section 104b sequentially sends the video packets received from the PID filtering section 102 to the continuity counter detecting section 105b regardless of whether these are error packets or not.

The continuity counter detecting section 105b checks the continuity of the video packets sent from the transport error indicator detecting section 104b by referencing the continuity counter of the TS packet headers in the multiple video packets sequentially sent from the transport error indicator detecting section 104b and confirming whether the continuity counter is incremented by one. When the continuity counter detecting section 105b detects a video packet having in its continuity counter a value that is non-consecutive relative to the continuity counter value of the preceding video packet, it sends to the packet removing section 107b the PID and continuity counter value of the packet, as well as information indicating that the packet is non-consecutive relative to the preceding video packet. The continuity counter detecting section 105b also sequentially sends the video packets received from the transport error indicator detecting section 104b to the unit start indicator detecting section 106b.

The unit start indicator detecting section 106b detects the leading packet of the PES (Packetized Elementary Stream) by receiving the video packets sequentially sent from the continuity counter detecting section 105b and referencing the unit start indicators of the TS packet headers. When the leading packet of the PES is detected, the unit start indicator detecting section 106b sends the PID of the packet to the packet removing section 107b.

The packet removing section 107b performs error packet removal processing based on the information sent from the transport error indicator detecting section 104b, continuity counter detecting section 105b, and unit start indicator detecting section 106b.

It should be noted that, unlike the above-described tuning/program information packets, it is preferable to send video packets to the video decoder 109 while refraining from discarding video packets as much as possible even if these are packets detected to be error packets. If a single error packet is discarded, the 184-byte data recorded in the payload is lost, and a large amount of normal data is discarded when data errors of only several bytes are present in an error packet. For this reason, in the case of video packets, refraining from discarding as much as possible allows for sending a large amount of normal data to the video decoder and makes it possible to reduce the disruption of video by block noise etc. However, when the error packets are consecutive, or when the error packet is a video packet whose unit start indicator equals "1", the probability that the video decoder will cause an extremely serious malfunction increases and, for this reason, it is preferable to perform packet removal processing.

Two preferred, but not limiting, specific examples of error packet removal processing performed in the packet removing section 107b are listed below.

SPECIFIC EXAMPLE 1

Removal Processing of Video Packets

When it is determined that a video packet whose continuity counter equals "n" is an error packet, it is sent to the video decoder 109 without removing the error packet (the video packet whose continuity counter equals "n") if the preceding video packet (i.e. the video packet whose continuity counter equals "(n−1)") is received in the normal fashion and is not an error packet. On the other hand, when it is determined that a video packet whose continuity counter equals "n" is an error packet and the preceding video packet (i.e. the video packet whose continuity counter equals "(n−1)") is missing or is an error packet, the video packet whose continuity counter equals "n" is removed. Thus, so long as the video packet preceding a video packet detected to be an error packet is not missing and is not an error packet, the video packet discard rate can be minimized and video quality can be improved by sending it to video decoder 109 without removing the error packet.

Figure 4:
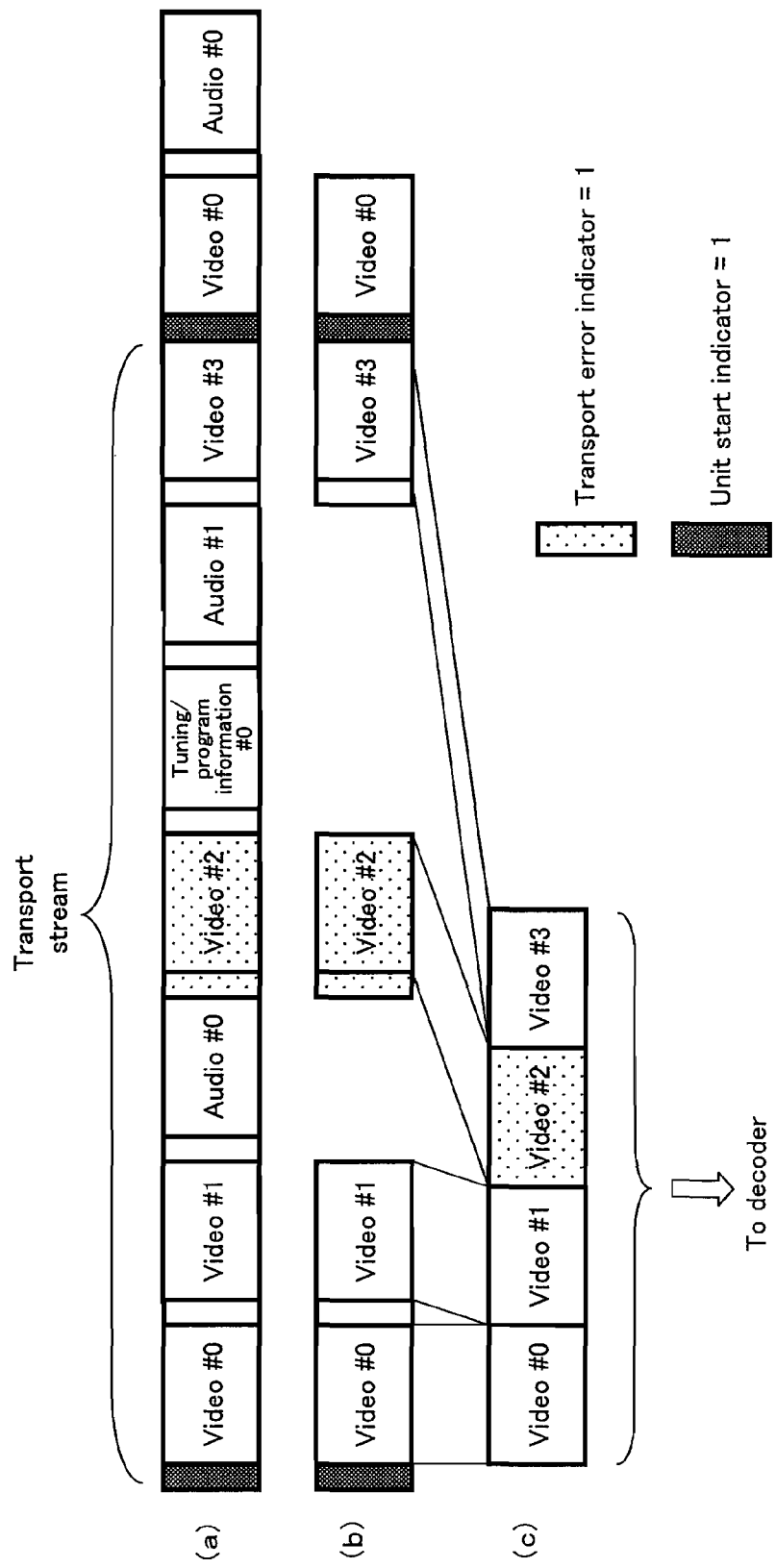
FIG. 4 is a schematic diagram illustrating an exemplary processing procedure used when an error occurs in a video packet in a digital broadcast receiver according to an embodiment of the present invention.

Here, it is assumed that the transport stream, such as the one illustrated, for instance, in FIG. 4(a), is received by the digital broadcast receiving section 101. It should be noted that, in FIG. 4, the numerals noted alongside the symbol "#" represent the continuity counter values in the respective packets. In the example of FIG. 4, the unit start indicator in the packet header of video packet #0 equals "1" and the transport error indicator in the packet header of video packet #2 equals "1". In other words, video packet #2 is an error packet. All other video packets are received in the normal fashion and are not error packets.

In this case, as shown in FIG. 4(b), the PID filtering section 102 extracts only the video packets and outputs them to the transport error indicator detecting section 104b. The packet removing section 107b then sends all the video packets #0-#3 to the video decoder 109 without removing video packet #2 because video packet #1, which precedes the error packet, i.e. video packet #2, is received correctly and is not an error packet. As a result, as shown in FIG. 4(c), the video packets contained in the PES are all decoded by the video decoder 109.

Figure 5:
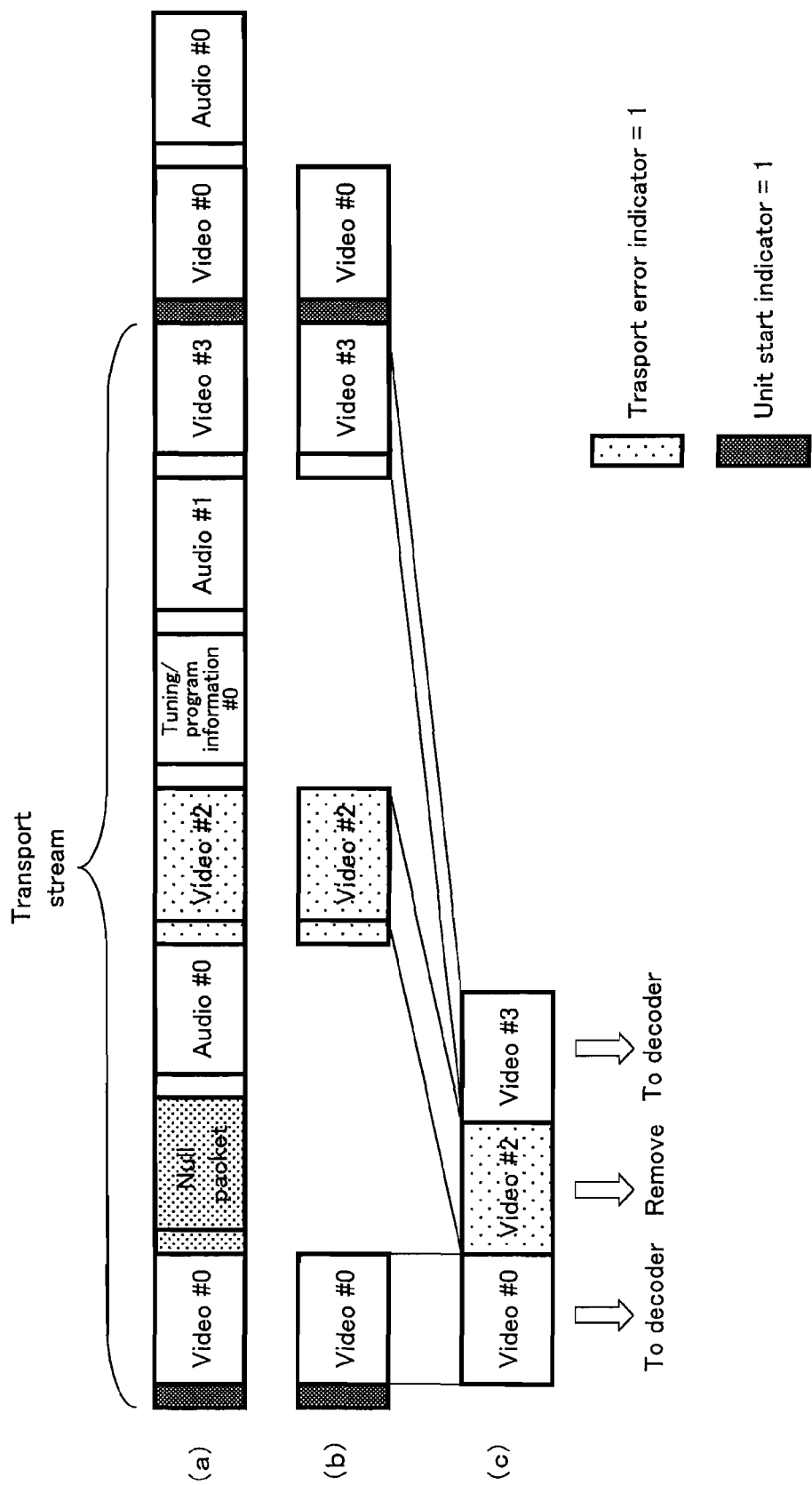
FIG. 5 is a schematic diagram illustrating another exemplary processing procedure used when an error occurs in a video packet in a digital broadcast receiver according to an embodiment of the present invention.

On the other hand, when a transport stream, such as the one illustrated, for instance, in FIG. 5(a), is received by the digital broadcast receiving section 101, the processing is as follows. In FIG. 5 the numerals noted alongside the symbol "#" also represent the continuity counter values of the packets. In the example of FIG. 5, the null packet that follows video packet #0 was originally video packet #1. However, it was inserted by the digital broadcast receiving section 101 to replace the original video packet due to a reception error that occurred therein. For this reason, in the transport stream illustrated in FIG. 5(a), the continuity counters of the video packets are non-consecutive, i.e. #0, #2, #3. Moreover, video packet #2 is an error packet. It is assumed that all other video packets are received in the normal fashion and are not error packets. In this case, as shown in FIG. 5(b), the PID filtering section 102 extracts only the video packets and outputs them to the transport error indicator detecting section 104b. At such time, the null packet is not extracted. Since video packet #1, which should have been in front of the error packet, i.e. video packet #2, has been dropped, the packet removing section 107b, as shown in FIG. 5(c), removes video packet #2 and sends only video packet #0 and video packet #3 to the video decoder 109.

It should be noted that, in the explanations above, it was assumed that the removal of an error packet was determined in accordance with the status of the video packet immediately preceding the error packet. However, in an alternative embodiment, a determination as to the removal of the error packet may be made based on the status of multiple video packets preceding the error packet.

SPECIFIC EXAMPLE 2

Removal Processing of Video Packets

If the number of error packets present between a video packet whose unit start indicator equals "1" and the next video packet whose unit start indicator equals "1" is not greater than a predetermined number, all the video packets are sent to the video decoder 109 regardless of whether these are error packets or not. On the other hand, if the number of error packets present between a video packet whose unit start indicator equals "1" and the next video packet whose unit start indicator equals "1" exceeds a predetermined number, the packet removing section 107b removes all the video packets within this interval. Thus, the video packet discard rate can be minimized and video quality can be improved by deciding whether to remove video packets in PES units in accordance with the number of error packets in PES video packets.

It should be noted that, instead of using as a reference the number of the error packets in the PES in the manner described above, the decision as to the removal of the video packets may be made depending on whether the proportion of error packets in the video packets present in the PES exceeds a predetermined value or not.

[3. Processing of Audio Packets]

The processing of audio packets is explained next.

With respect to the audio packets sent from the PID filtering section 102 to the transport error indicator detecting section 104c, the transport error indicator detecting section 104c determines whether the packets contain an uncorrectable bit error. Namely, the transport error indicator detecting section 104c references the value of the transport error indicator of the TS packet header in an audio packet and determines that the packet is an error packet containing an uncorrectable bit error if the value is set to "1". When an error packet is detected, the transport error indicator detecting section 104c sends to the packet removing section 107c the PID and continuity counter value of the packet, as well as information indicating that the packet is an error packet. The transport error indicator detecting section 104c sequentially sends the audio packets received from the PID filtering section 102 to the continuity counter detecting section 105c regardless of whether these are error packets or not.

The continuity counter detecting section 105c checks the continuity of the audio packets sent from the transport error indicator detecting section 104c by referencing the continuity counter of the TS packet headers in the multiple audio packets sequentially sent from the transport error indicator detecting section 104c and confirming whether the continuity counter is incremented by one. When the continuity counter detecting section 105c detects an audio packet having in its continuity counter a value that is non-consecutive relative to the continuity counter value of the preceding audio packet, it sends to the packet removing section 107c the PID and continuity counter value of the packet, as well as information indicating that the packet is non-consecutive relative to the preceding audio packet. The continuity counter detecting section 105c also sequentially sends the audio packets received from the transport error indicator detecting section 104c to the unit start indicator detecting section 106c.

The unit start indicator detecting section 106c detects the leading packet of the PES (Packetized Elementary Stream) by receiving the audio packets sequentially sent from the continuity counter detecting section 105c and referencing the unit start indicators of the TS packet headers. When the leading packet of the PES is detected, the unit start indicator detecting section 106c sends the PID of the packet to the packet removing section 107c.

The packet removing section 107c performs error packet removal processing based on the information sent from the transport error indicator detecting section 104c, continuity counter detecting section 105c, and unit start indicator detecting section 106c.

It should be noted that, unlike the above-described video packets, error packets of audio packets here preferably are deleted as much as possible and not sent to the audio decoder 110. This is due to the fact that if the audio packets contained in the PES contain error packets, considerable noise often is generated during decoding even if the errors are very small.

Three preferred, but not limiting, specific examples of error packet removal processing performed in the packet removing section 107c are listed below.

SPECIFIC EXAMPLE 1

Removal Processing of Audio Packets

Along with removing audio packets detected to be error packets, the audio packet removing section 107c also removes the audio packet whose continuity counter is greater than that of the audio packet by one even if the subsequent packet is not an error packet. Thus, the generation of noise during decoding can be minimized effectively by removing the error packet along with the subsequent packet and not sending them to the audio decoder 110. It should be noted that multiple packets subsequent to the error packet may be removed as well.

SPECIFIC EXAMPLE 2

Removal Processing of Audio Packets

If there is even a single error packet between an audio packet whose unit start indicator equals "1" and the next audio packet whose unit start indicator equals "1", the audio packet removing section 107c removes all the audio packets within this interval. Thus, the generation of noise can be minimized effectively by removing audio packets in PES units whenever there is even one error packet among the audio packets of a PES.

SPECIFIC EXAMPLE 3

Removal Processing of Audio Packets

In this example, the continuity counter detecting section 105c references audio packets whose transport error indicator equals "0", i.e. error-free audio packets, in order to check whether the continuity counter values of these audio packets are consecutive. Then, upon detection of an audio packet whose continuity counter value is non-consecutive relative to the preceding audio packet, this audio packet is replaced with an audio packet containing in its payload specific information indicating a discontinuity and the subsequently received initial null packet is replaced with the audio packet having a discontinuity detected therein.

Figure 6:
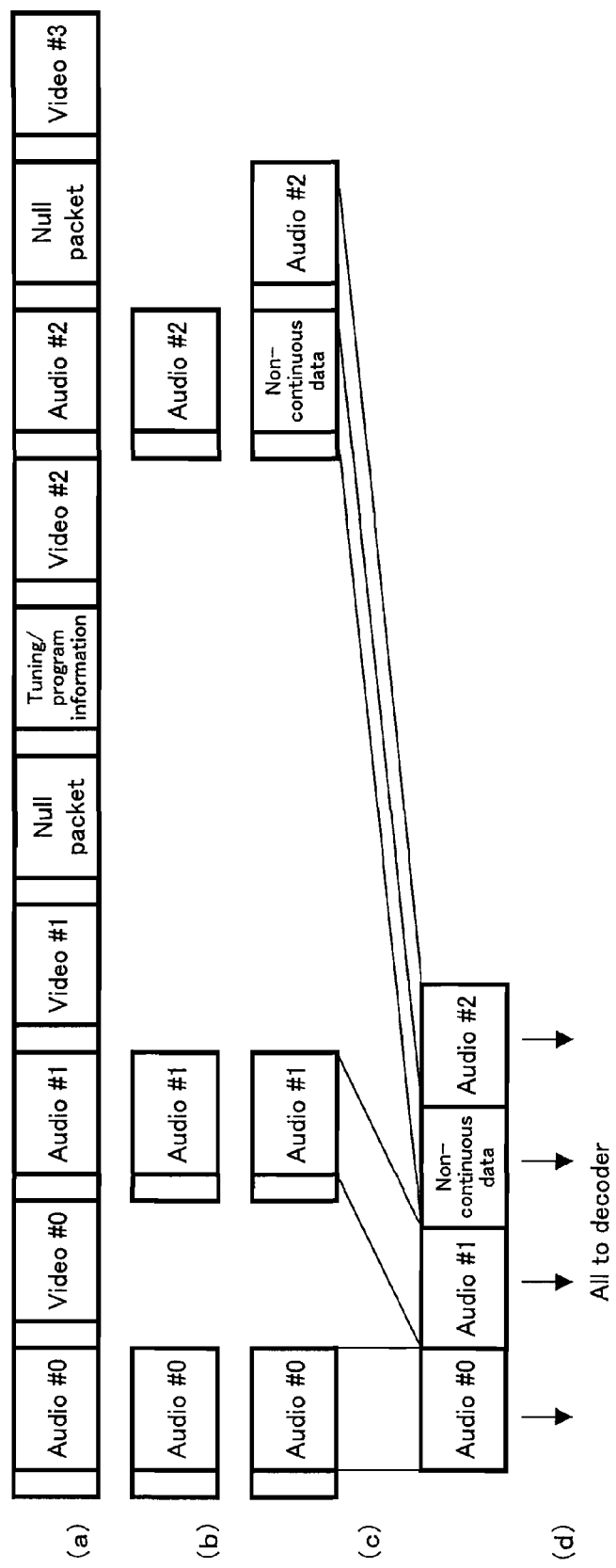
FIG. 6 is a schematic diagram illustrating yet another exemplary processing procedure used when an error occurs in a video packet in a digital broadcast receiver according to an embodiment of the present invention.

It is assumed that the transport stream, such as the one illustrated, for instance, in FIG. 6(*a*), is received by the digital broadcast receiving section 101. It should be noted that, in FIG. 6, the numerals noted alongside the symbol "#" represent the continuity counter values in the respective packets. In the example of FIG. 6, the null packet following video packet #1 was originally audio packet #2. However, it was inserted by the digital broadcast receiving section 101 to replace the original audio packet due to a reception error that occurred therein. For this reason, in the transport stream illustrated in FIG. 6(*a*), the continuity counters of the audio packets are non-consecutive, i.e. #0, #1, #3. All other audio packets are received in the normal fashion and are not error packets.

In this case, as shown in FIG. 6(*b*), the PID filtering section 102 extracts only the audio packets and outputs them to the transport error indicator detecting section 104c. After that, when the continuity counter detecting section 105c receives audio packet #3 and detects a discontinuity, information about it is sent to the packet removing section 107c. The packet removing section 107c, as shown in FIG. 6(*c*), replaces audio packet #3 with an audio packet containing in its payload specific information indicating a discontinuity and replaces the subsequently received initial null packet with audio packet #3, which has a discontinuity detected therein. The packet removing section 107c sends the audio packets replaced as described above to the audio decoder 110.

Examples of the specific information indicating a discontinuity include, for instance, multiple-byte data determined in advance so as to be clearly distinguishable from other audio data between the continuity counter detecting section 105c, which inserts it, and the audio decoder, which detects it, as well as audio data indicating silence appended to the header portion, etc. In the former case, the audio decoder has to be imparted with functionality for the detection of the specific information, while in the latter case the audio decoder inherently possesses functionality for detecting the header portion and there is no need to modify the audio decoder.

Since the audio decoder decodes audio using only the ordinary payload, continuity counter-based discontinuity detection is impossible. For this reason, the recognition of non-consecutive audio packets as consecutive ones by mistake and their decoding in the audio decoder have been a factor in generating noise. However, the above-described processing brings the benefit of allowing discontinuities to be detected by the audio decoder based on the specific discontinuity-indicating information recorded in the payload and making it possible to minimize the noise.

As described above, whenever error packets occur, the digital broadcast receiver 100 according to the present embodiment handles them separately with the help of the respective component series used for video packets, audio packets, and tuning/program information packets. Moreover, even if a video packet is an error packet, effort is made to avoid deletion as much as possible. In the case of audio packets, however, deletion of the error packets allows for suppressing noise due to audio packet errors and improving audio quality while maintaining video quality.

It should be noted that the following processing is contemplated instead of the specific examples described above. Namely, no matter what the type of the packet is, a TS packet whose unit start indicator equals "1" contains important parameters required during decoding. Therefore, so long as the error indicator equals "1" in a TS packet whose unit start indicator equals "1", it is preferable to remove the TS packet in the packet removing sections 107a-107c without sending it to the decoder. Such processing makes it possible reliably to prevent the occurrence of malfunctions due to erroneous parameters.

Figure 7:
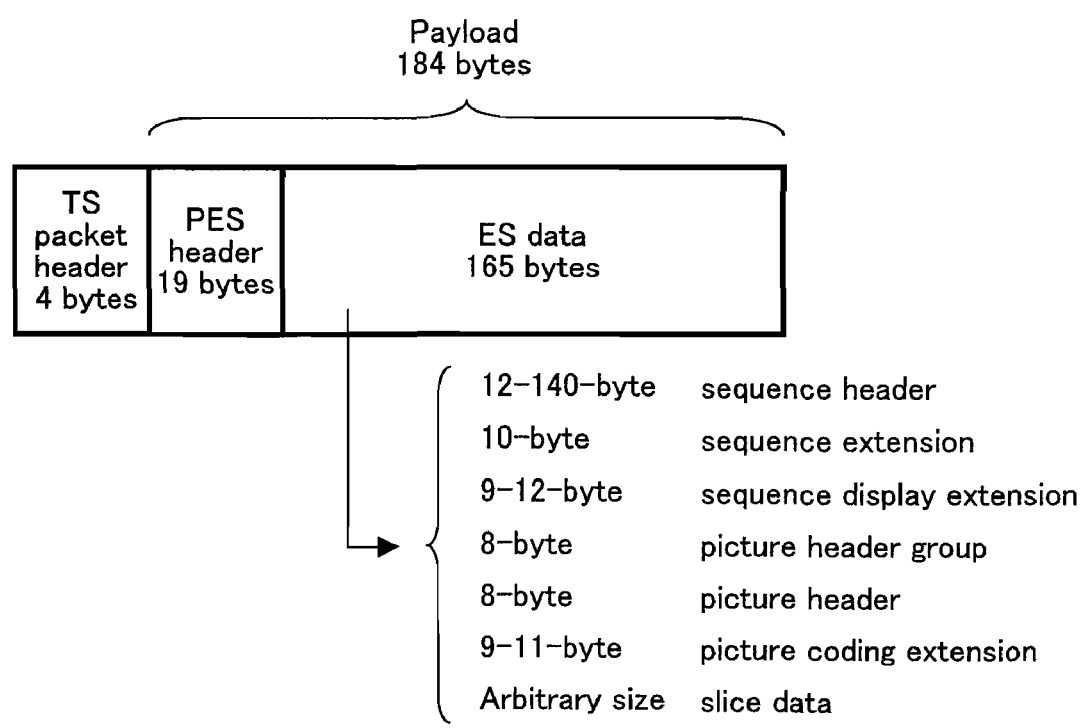
FIG. 7 is a diagram illustrating the data structure of a video packet (I picture) whose unit start indicator equals "1".

For example, as shown in FIG. 7, in the case of a video packet (I picture) whose unit start indicator equals "1", the payload contains a 19-byte PES header and ES data. The ES data contains a 12- to 140-byte sequence header, a 10-byte sequence extension, a 9- to 12-byte sequence display extension, an 8-byte picture header group, a 9- to 11-byte picture coding extension, and slice data of an arbitrary size (image data). It should be noted that all of the ES data are essential data.

Figure 8:
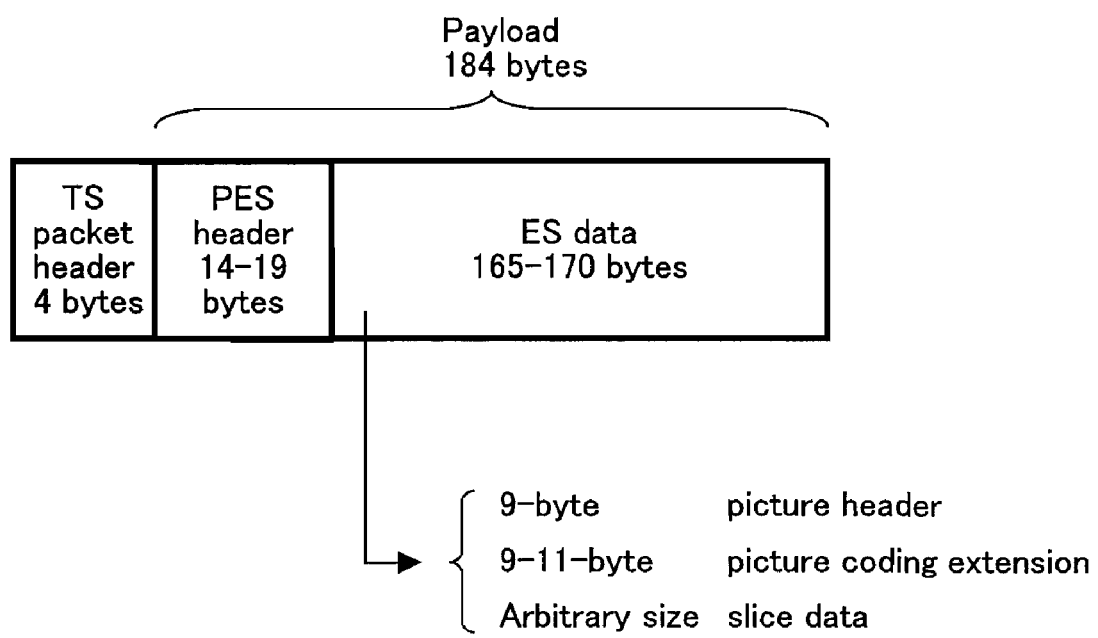
FIG. 8 is a diagram illustrating the data structure of a video packet (B picture, P picture) whose unit start indicator equals "1".

Moreover, as shown in FIG. 8, in the case of a video packet (B picture or P picture) whose unit start indicator equals "1", the payload contains a 14- to 19-byte PES header and ES data. The ES data contains a 9-byte picture header, a 9- to 11-byte picture coding extension, and slice data of an arbitrary size (image data). It should be noted that all of the ES data are essential data.

It should be noted that in any case, no matter whether this is an I picture, B picture, or P picture, whenever the overall data length exceeds 188 bytes, the excess data beyond 188 is stored in the next packet.

As can be seen from FIG. 7 and FIG. 8, before the slice data, a video packet whose unit start indicator equals "1" includes parameters important to the decoding of the image, such as those related to image size, etc., with the parameters being 62 to 212 bytes in length in case of an I picture and 36 to 43 bytes in length in case of a B picture or P picture.

Figure 9:
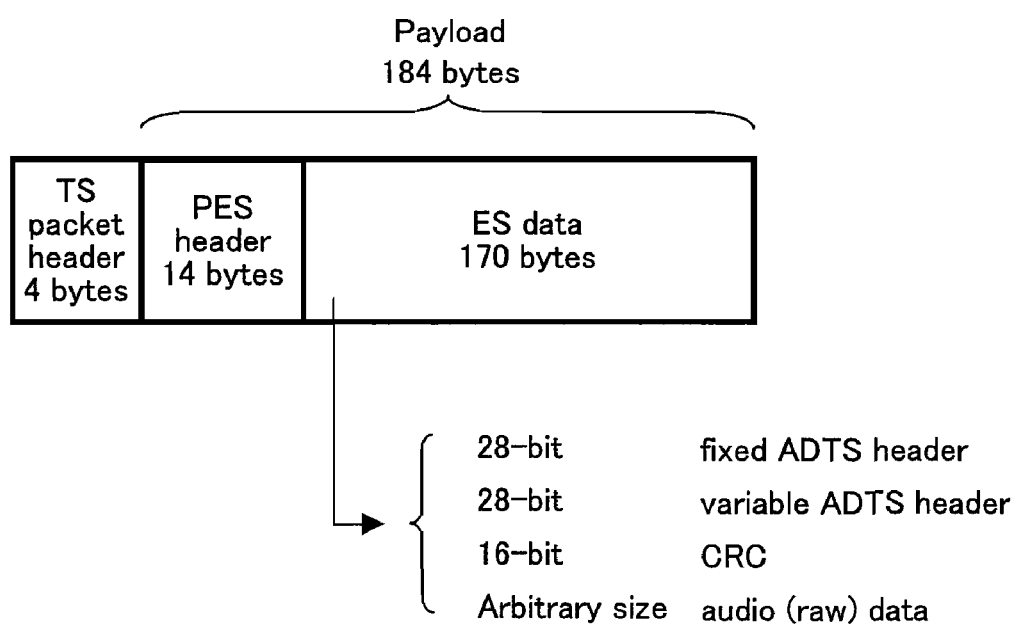
FIG. 9 is a diagram illustrating the data structure of an audio packet whose unit start indicator equals "1".

Moreover, as shown in FIG. 9, in the case of an audio packet whose unit start indicator equals "1", the payload contains a 14-byte PES header and ES data. The ES data contains a 28-bit fixed ADTS header, a 28-bit variable ADTS header, a 16-bit CRC, and raw data of an arbitrary size (audio data). It should be noted that all of these ES data are essential data. The 27 bytes prior to the raw data contain parameters important during audio decoding, such as audio channel configuration, etc.

Consequently, if a TS packet whose unit start indicator equals "1" is an error packet, as described above, the TS packet is preferably removed regardless of the type of the packet. It should be noted that the packet structure illustrated in FIG. 7-FIG. 9 is an example, and the data length, etc. may vary depending on the broadcasting station and applicable standards.

While some embodiments of the present invention have been explained above, the above-described embodiments are merely specific examples of how the present invention may be practiced and permit various modifications within the scope of the present invention.

For instance, in the above-described embodiments, the explanations were based on exemplary TS packets conforming to the MPEG2_TS format. However, the formats, to which the present invention can be applied, are not limited thereto.

Moreover, in the above-described embodiments, the explanations assumed that a digital broadcast (TV broadcast) was received. However, the present invention is also applicable to cases in which video data and audio data are separately packetized and transmitted using Internet-based streaming delivery, with error information on the packets included in the transmitted packets.

Industrial Applicability

The present invention is industrially applicable as a digital data receiver capable of combining audio quality with video quality.

The invention claimed is:

1. A digital data receiver comprising:
   a filtering section that identifies a video packet and an audio packet contained in received digital data,
   an audio processing section that performs decoding processing of the audio packet identified by the filtering section and outputting audio data, and
   a video processing section that performs decoding processing of the video packet identified by the filtering section and outputting video data,
   wherein the audio processing section comprises:
   an audio packet error detecting section that references header information in the audio packet to determine whether the audio packet is an error packet, and
   an audio packet removing section that removes an audio packet determined to be an error packet and inserts an audio packet containing specific information enabling discontinuity detection by an audio decoder in the subsequent stage,
   wherein the video processing section comprises:
   a video packet error detecting section that references header information in the video packet to determine whether the video packet is an error packet, and
   a video packet removing section that removes a video packet determined to be an error packet only when the video packet satisfies predetermined conditions, and
   wherein the video packet removing section removes the video packet determined to be an error packet when one or a plurality of video packets preceding the video packet determined to be an error packet have not been received, and
   wherein the video packet removing section removes the video packet determined to be an error packet when the one or the plurality of video packets preceding the video packet determined to be the error packet are error packets.

2. The digital data receiver according to claim 1, wherein the video packet removing section removes video packets determined to be error packets when the number of the video packets determined to be error packets among the video packets contained in an encoding processing unit exceeds a predetermined criterion.

3. The digital data receiver according to claim 1, wherein the video packet removing section removes a video packet determined to be an error packet when the video packet is the leading packet of an encoding processing unit.

4. The digital data receiver according to claim 1, wherein the audio packet removing section also removes one or a plurality of audio packets subsequent to an audio packet determined to be an error packet.

5. The digital data receiver according to claim 1, wherein the audio packet removing section removes all the audio packets contained in an encoding processing unit when an audio packet determined to be an error packet is present among the audio packets contained in the encoding processing unit.

6. The digital data receiver according to claim 1, wherein when an audio packet determined to be an error packet is present among audio packets contained in an encoding processing unit, the audio packet removing section removes the error packet contained in the encoding processing unit and all the audio packets preceding thereto.

7. The digital data receiver according to claim 1, further comprising a program/tuning information packet removing section that removes a tuning/program information packet determined to be an error packet.

8. The digital data receiver according to claim 7, wherein the program/tuning information packet removing section removes all the program/tuning information packets contained in an encoding processing unit when a program/tuning information packet determined to be an error packet is present among the program/tuning information packets contained in the encoding processing unit.

* * * * *